(12) United States Patent
Tabata et al.

(10) Patent No.: US 6,395,239 B1
(45) Date of Patent: May 28, 2002

(54) OZONIZER

(75) Inventors: Yoichiro Tabata; Akira Usui, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/615,320

(22) Filed: Jul. 13, 2000

Related U.S. Application Data (63) Continuation of application No. PCT/JP98/05387, filed on Dec. 1, 1998.

(30) Foreign Application Priority Data

Dec. 1, 1998 (WO) .................................. PCT/98/05387

(51) Int. Cl.$^7$ .................................................. B01J 19/08
(52) U.S. Cl. .............................. 422/186.07; 422/186.11
(58) Field of Search ...................... 422/186.07, 186.11

(56) References Cited

U.S. PATENT DOCUMENTS 5,211,919 A * 5/1993 Conrad .................. 422/186.07
5,759,497 A    6/1998 Kuzumoto et al. .... 422/186.07

FOREIGN PATENT DOCUMENTS

| JP | 55-162410 | 12/1980 |
| JP | 8-12304 | 1/1996 |

OTHER PUBLICATIONS

"Ozone In Water Treatment, Application And Engineering" Awwa Research Foundation and Lewis Publishers, No month available 1991, p. 388.

"Ozonizer Handbook", Ozonizer specialty committee in the Institute of Electrical Engineers of Japan, Jun. 15, 1990, p. 249.

* cited by examiner

*Primary Examiner*—Kishor Mayekar
*Assistant Examiner*—Thao Tran
(74) *Attorney, Agent, or Firm*—Leydig, Voit & Mayer, Ltd.

(57) ABSTRACT

An improvement in a short-gap ozonizer having a gap of 0.5 mm or shorter between facing flat electrodes. By adjusting the height of a spacer, sandwiched between the flat electrodes, from the flat side of the electrode, the gap is adjusted to adjust the dispersion of the gap between the flat electrodes.

16 Claims, 10 Drawing Sheets

OZONIZER

CROSS-REFERENCE TO THE RELATED APPLICATION

This Application is a continuation of International Application No. PCT/JP98/05387, whose international filing date is Dec. 1, 1998, the disclosure of which Application incorporated by reference herein.

BACKGROUND OF THE INVENTION

1. Field of the Invention

This invention relates to an ozonizer for producing ozone gas by supplying oxygen to a so-called "dielectric barrier discharge" which is caused on the two sides of a dielectric and, more particularly, to an improvement in a short-gap ozonizer having a discharge gap of 0.5 mm or less.

2. Description of the Related Art

In a device for generating ozone, as known in the prior art, the ozone gas is produced by supplying the oxygen gas to a so-called "dielectric barrier discharge" which is caused on two sides of the dielectric.

Figure 10:
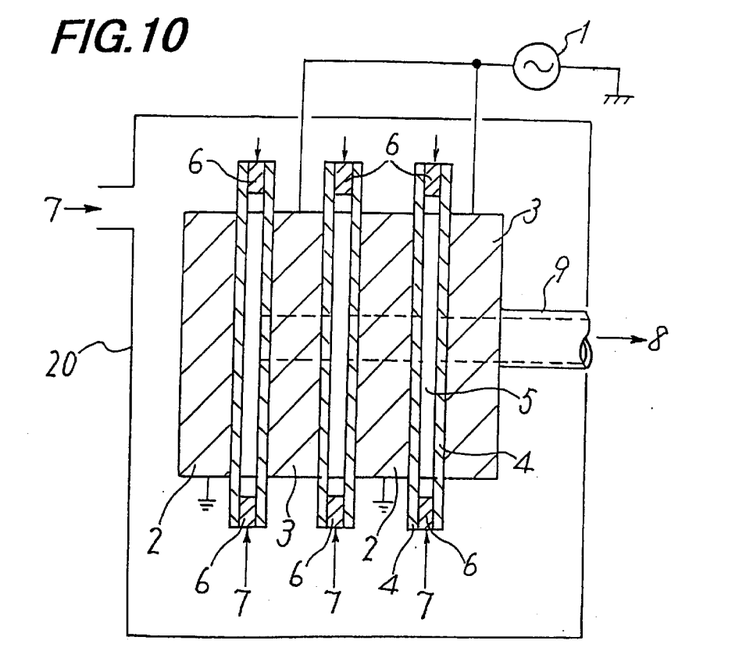
FIG. 10 is a sectional view of the ozonizer of the prior art.
Figure 11:
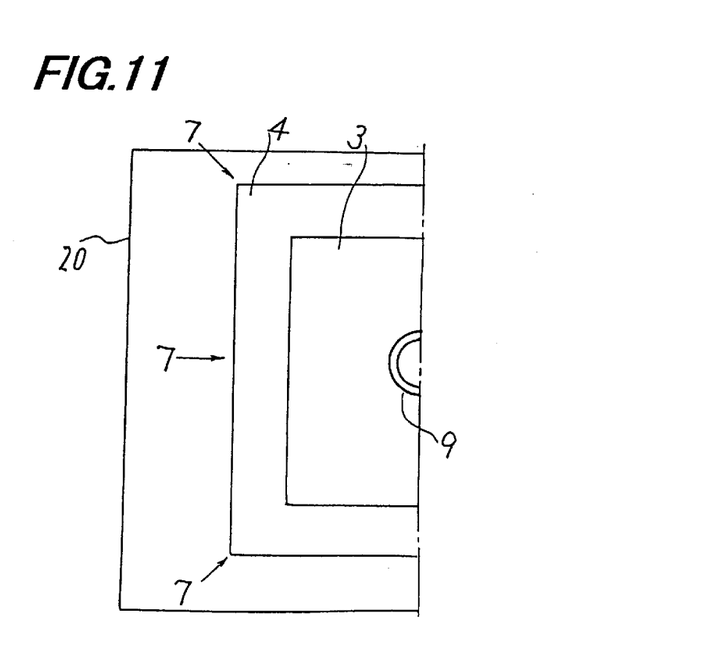
FIG. 11 is a front elevation of FIG. 10.

FIGS. 10 and 11 are a sectional view and a front elevation (of one half) showing the conventional ozonizer of the Otto plate type, as called and so disclosed on pp. 249 of "OZONIZER HANDBOOK" (edited by Ozonizer Expert Committee of Electric Society and published by CORONA in 1960). As shown, reference numeral 1 designates a discharging power source for generating a high voltage, and its one output is grounded. Numeral 2 designates an earthed electrode made of a metal; numeral 3 designates a high-voltage electrode disposed to face the earthed electrode 2 and connected with the high-voltage terminal of the power source 1; and numeral 4 designates a dielectric (as exemplified by a glass plate) placed on the surface of the earthed electrode 2 and on the surface of the high-voltage electrode 3. This dielectric 4 is covered with a metal on its side in contact with the earthed electrode 2 or the high-voltage electrode 3 for the power supply. The dielectric 4 is usually thin and is called a "dielectric sheet".

Numeral 5 designates a discharging gap (as will be shortly called the "gap") formed between the dielectric 4 on the earthed electrode 2 and the dielectric 4 on the high-voltage electrode 3, and numeral 6 designates a spacer for forming the discharging gap 5 to keep the two electrodes from contacting each other. Numeral 7 designates a supply port for supplying a gas including oxygen; numeral 8 designates an exhaust port for exhausting an ozonized gas; numeral 9 designates an exhaust pipe for the same; and numeral 20 designates a casing. In the example of FIGS. 10 and 11, the dielectric 4 is used on the two sides of the discharging gap 5. In the following individual Figures, the detailed description of identical or corresponding portions will be omitted by designating them by common reference numerals.

Figure 12:
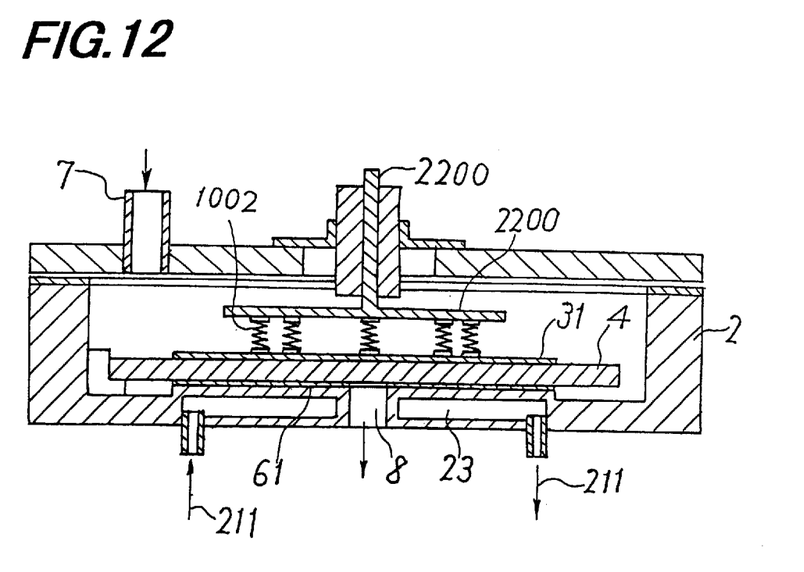
FIG. 12 is a sectional view of the ozonizer of the prior art.
Figure 13:
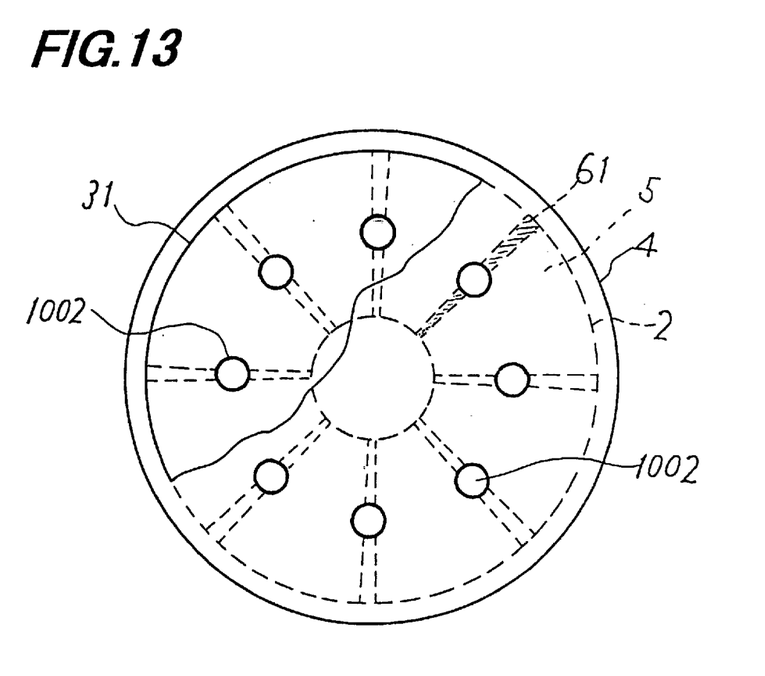
FIG. 13 is a front elevation of a portion of FIG. 12.

FIG. 12 and FIG. 13 show an ozonizer having a small gap (e.g., 0.5 mm or less), as disclosed in Unexamined Published Japanese Patent Application 8-12304, and FIG. 12 presents a sectional view whereas FIG. 13 presents a front elevation of a portion of the earthed electrode 2 and the dielectric 4. As shown, the numeral 2 designates a circular earthed electrode acting as an electrode and a container, and this earthed electrode 2 has a cooling passage 23 therein for allowing cooling water to pass therethrough. Arrows 211 designate the flows of the cooling water. The numeral 4 designates a disc-shaped dielectric made of ceramic, and this dielectric 4 has a conductive film 31 on its upper side for supplying the high voltage. Between the lower side of the dielectric 4 and the earthed electrode 2, there is disposed a radial spacer 61, by which a radial discharging gap 5 is formed between the dielectric 4 and the earthed electrode 2. Numeral 2200 designates a high-voltage terminal which is pushed onto the spacer 61 and the dielectric 4 through an interference spring 1002 thereby to form one discharge cell. In the example shown in FIG. 12 and FIG. 13, the dielectric 4 is disposed on only one side of the discharging gap 5, and the earthed electrode 2 has a water-cooled structure.

In the ozonizer of the prior art, an electrode conductive film is formed by a deposition or metallizing method or another method on one side of the dielectric 4 so as to bond the earthed electrode 2 and the dielectric 4, as well as the high-voltage electrode 3 and the dielectric 4. On the other hand, the size of the discharging gap 5 is far smaller (e.g., 1 mm or less) than that of the electrodes so that the spacer 6 or 61 having a predetermined thickness at the assembling time is sandwiched so as to hold that gap precisely. A high voltage is applied to establish a discharge between the two electrodes. When oxygen is supplied to the discharge, there occur the dissociation of oxygen and three-body collisions of oxygen atoms and oxygen molecules. As a result, ozone is produced.

It has been desired to enhance the ozone producing efficiency (i.e., the amount of ozone to be produced for a predetermined power) to be taken by the discharge. In the prior art, the efficiency is about 20% at the maximum. The ozone producing efficiency depends upon the discharging gas temperature (as seriously influenced by the electrode temperature) so that it is the higher at the lower temperature. However, most of the discharging power is converted into heat at the earthed electrode 2 and the high-voltage electrode 3 so that the temperatures of the electrodes rise. In order to enhance the ozone producing efficiency, therefore, the electrodes 2 and 3 are forcibly cooled with water or the like.

Figure 14:
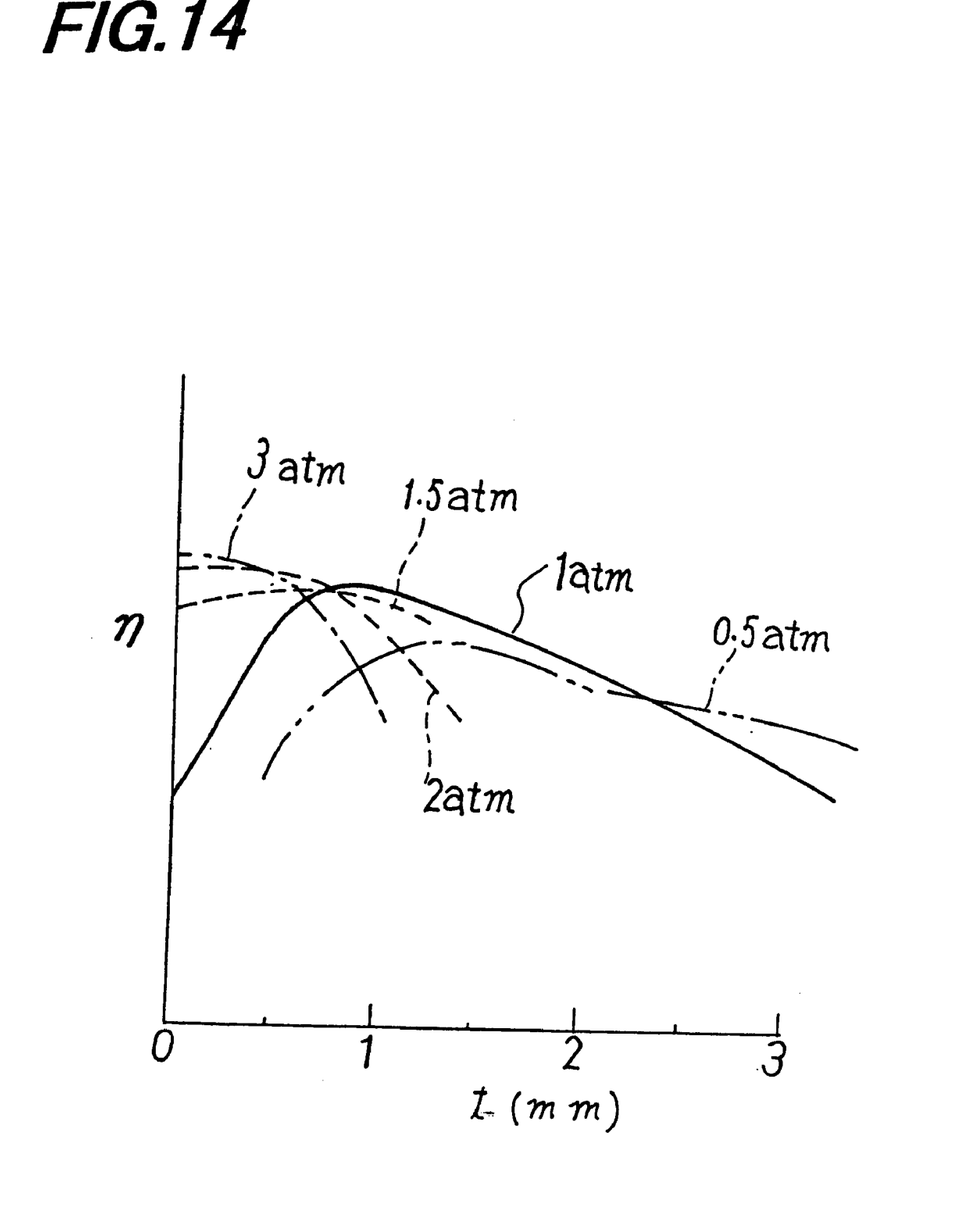
FIG. 14 is an explanatory view of the characteristics of the ozonizer of FIG. 12.

On the other hand, FIG. 14 presents a graph, as disclosed in FIG. 4 of the aforementioned Unexamined Published Japanese Patent Application 8-12304. In this graph, relations between the size t of the discharging gap 5 and the ozone producing efficiency $\eta$ are illustrated by using a gas pressure as a parameter. As seen from FIG. 14, the efficiency can be improved for a smaller gap if the gas pressure is accordingly raised. Therefore, it has been desired to make the gap as small as possible.

In order to enhance the ozone producing efficiency, as described above, the ozonizer of the prior art has to make the discharging gap smaller. In order to keep the electrodes at a low temperature, on the other hand, it is also necessary to provide the cooling passage 23 for the cooling water in the electrode. If this electrode is thus cavitated, its surface is slightly deformed by the water pressure. The degree of deformation fluctuates due to fluctuation in the water pressure. This deformation or its degree raises no serious problem when the gap is large. For the smaller gap, their influences becomes the more serious. It is, therefore, very difficult to make the gap as small as about 0.1 mm.

In the ozonizer of the prior art, as described above, the dielectric sheet 4 having a thickness of about 1 mm is bonded to the electrode, and the spacer 7 or 61 for forming the discharging gap 5 is integrated with the dielectric sheet 4 by flame-spraying a ceramic to a portion of the electrode or the dielectric sheet 4. Therefore, the adjustment of the gap is seriously difficult because the flame-spraying treatment has to be done again or because the flame-spraying surface has to be scraped.

If the individual discharging gaps are of a size when they are formed in multiple stages by laminating the electrodes, on the other hand, the gas containing oxygen can be supplied at a pressure suited for the gaps so that the overall efficiency is improved. With a dispersion in the gaps, however, the optimum pressure is also dispersed to lower the overall efficiency.

On the other hand, the dielectric sheet 4 is merely sandwiched or adhered between the spacer and the electrode. With a high flatness or warpage of the dielectric sheet 4, therefore, there occurs a problem that the ozone producing efficiency is lowered by an insufficient contact between the dielectric sheet 4 and the electrode or that the dielectric sheet 4 itself cracks in the bonding work.

With the problems thus far described, it is resultantly difficult to enhance the ozone producing efficiency. Since the conventional dielectric sheet is made thin, on the other hand, it takes a polishing work lengthy to manufacture a dielectric sheet which is so accurate as to have a planarity with little warpage. This long polishing work leads to a problem in raising the cost significantly.

SUMMARY OF THE INVENTION

The invention has an object to provide an ozonizer achieving a narrower gap easily and adjusting a gap (i.e., a distance between a pair of flat electrodes) easily.

Another object is to provide an electrode structure which is hardly deformed by changes in water pressure and temperature.

Still another object is to provide a hardly deformed dielectric sheet at a low cost.

Thus according to the invention, there is provided an ozonizer comprising: a pair of flat electrodes arranged to face each other and having a hole portion formed in the facing side of at least one of the paired flat electrodes; a dielectric sheet disposed on the facing side of at least one of the paired flat electrodes; high-voltage applying unit for applying a high voltage between the paired flat electrodes; gas supply unit for supplying a gas containing oxygen to a gap formed between the paired flat electrodes; a spacer so fitted in the hole portion as to protrude from the surface of the flat electrode having the hole portion, for forming the gap with the protrusion; and an adjusting member such as an adjusting sheet and an adjustiong screw and so on for adjusting the height of protrusion of the spacer.

In this invention, the spacer inserted in the hole portion is thicker than the gap so that it can be easily handled, and the spacer is fitted in the hole portion so that it does not come out at the assembling time. By the adjusting member, the height of the protrusion of the spacer can be easily adjusted to adjust the size of the gap which is determined by the protrusion of the spacer.

On the other hand, at least one flat electrode includes a cooling passage for allowing a coolant to pass therethrough, and a reinforcing member extending from the front face to the back face of the flat electrode through the cooling passage. Then, the surface of the flat electrode can be prevented from being deformed by the pressure of water flowing in the cooling passage.

On the other hand, the flat electrode having the dielectric sheet arranged thereon has a recess in its facing side, and the dielectric sheet has such a projection on its side of the flat electrode as is fitted in the recess. The dielectric sheet can be firmly held on the flat electrode and prevented from warping or cracking. Moreover, the dielectric sheet is wholly made of one sintered body together with the projection. As a result, the thermal distortion of the dielectric sheet due to the high temperature at the sintering time can be absorbed by the projections to provide a sheet having a high parallelism and little warpage. Moreover, the time period for shaping the dielectric sheet by the polishing treatment can be drastically shortened to result in a low cost.

BRIEF DESCRIPTION OF DRAWINGS

FIG. 7($a$) is a sectional view FIG. 7($b$) is front view of a portion of an ozonizer of Embodiment 4

DETAILED DESCRIPTION OF THE PREFERRED EMBODIMENTS

Embodiment 1

Figure 1:
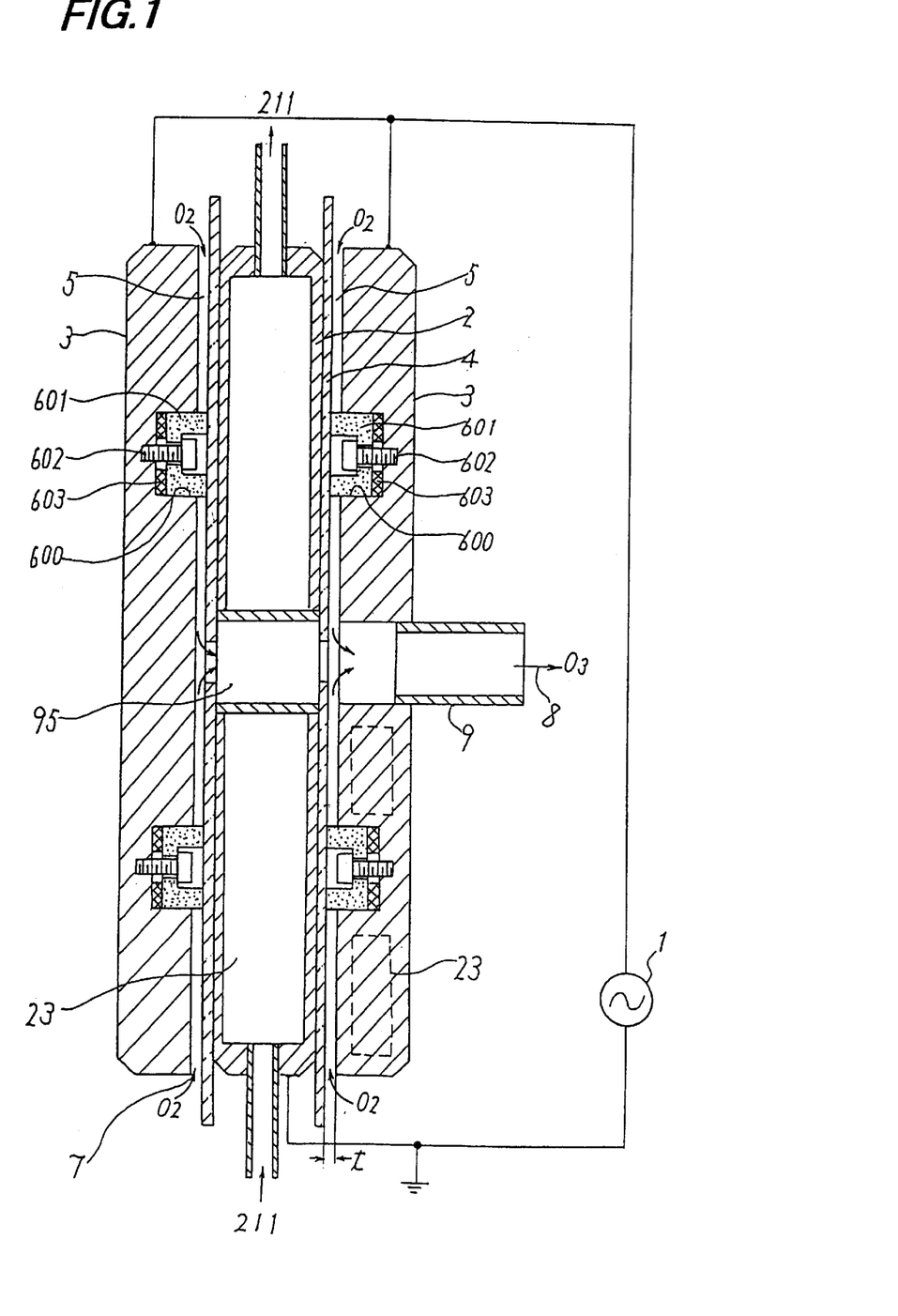
FIG. 1 is a sectional view of an ozonizer of Embodiment 1 of this invention.
Figure 2:
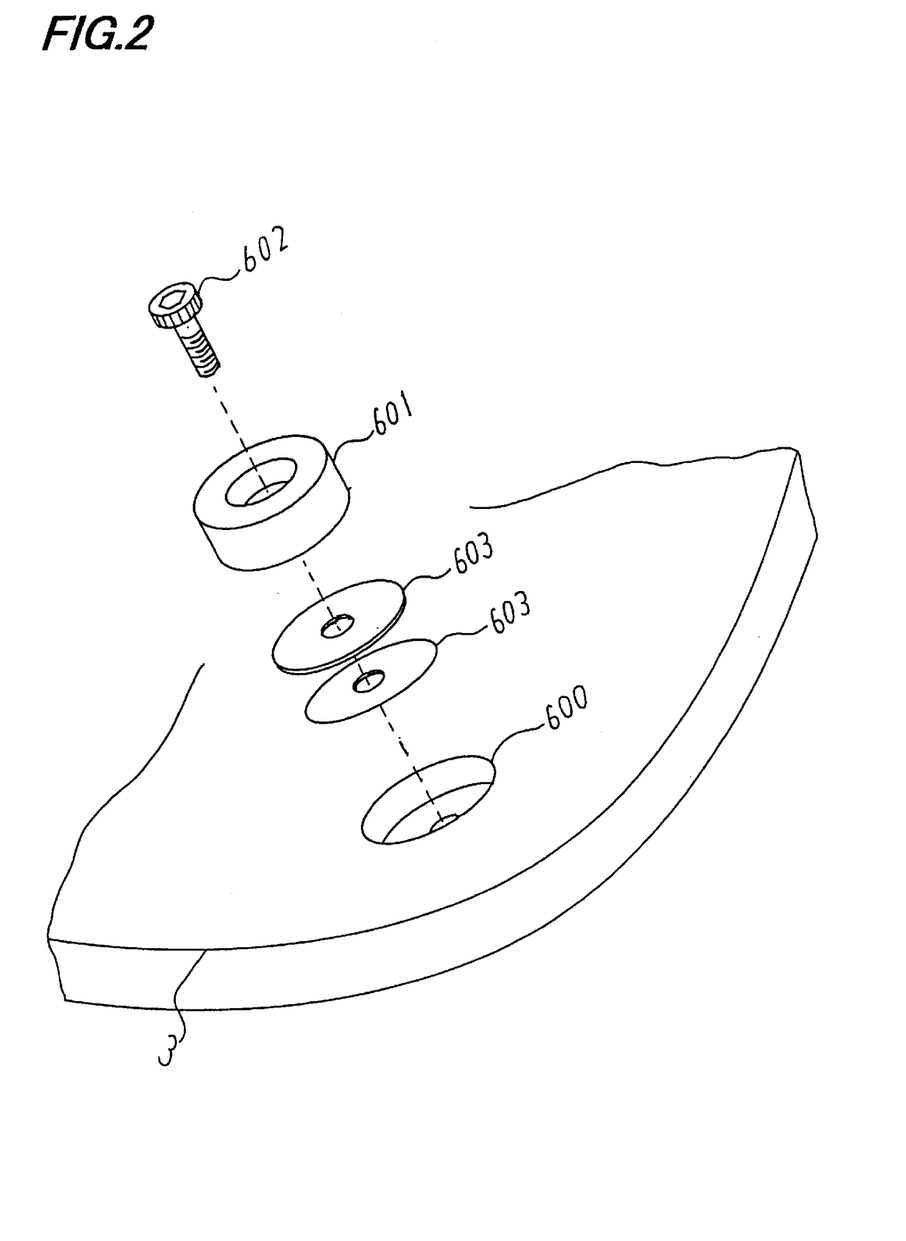
FIG. 2 is a detailed explanatory view of a portion of FIG. 1.

An ozonizer according to Embodiment 1 of this invention will be described with reference to FIGS. 1 and 2. FIG. 1 presents a sectional view, and FIG. 2 presents a perspective view of portion of FIG. 1. As in the following other Figures, a detail of a portion of a discharge cell or the ozonizing portion is shown, and a casing 20 of the ozonizer will be simplified or omitted. For conveniences of the description, the discharge cell is shown as a single-layered discharge cell in FIG. 1, and two discharging gap portions 5 are shown. The ozonization capacity can be proportionally increased by laminating the discharge cells in multiple layers. Reference numeral 2 designates a plate-shaped earthed electrode having a cooling passage 23 therein, and numeral 3 designates a plate-shaped high-voltage electrode having the cooling passage 23 therein for allowing the coolant to pass therethrough.

Both the earthed electrode 2 and the high-voltage electrode 3 are made of stainless steel into such a disc shape as can be cooled by supplying a coolant such as water thereinto in a direction 211. Numeral 4 designates a disc-shaped dielectric sheet made of a sintered sheet of ceramics such as alumina or a glass sheet. This dielectric sheet 4 is made to have a thickness of about 1 mm. Numeral 5 designates a discharging gap which is formed between the facing sides of the earthed electrode 2 and the high-voltage electrode 3 arranged across a spacer 601.

Numeral 600 designates a circular groove (or a hole portion) formed in a side, as facing the discharging gap 5, of the high-voltage electrode 3, and numeral 601 designates a spacer which is fitted in the hole portion 600 and has a hole at its center portion. This spacer can be removed from the hole portion 600. Numeral 602 designates a screw which is inserted into the center hole of the spacer 601 for fixing the spacer 601 in the high-voltage electrode 3. Numeral 603 designates a gap adjusting sheet which is made of a plurality of metal sheets of about 0.01 to 0.05 mm stacked and sandwiched between the high-voltage electrode 3 and the spacer 601. When the electrode is circular, it is advisable to provide at least three hole portions 600. The number of stacked gap adjusting sheets 603 or the metal sheet to be used is so adjusted that the spacer 601 may protrude slightly from the surface of the electrode when the screw 602 is fastened. The spacer 601 is held in contact with the dielectric sheet 4 of the earthed electrode 2 to leave the protrusion size for the spacer 601 to protrude from the surface of the high-voltage electrode 3, as the size (as indicated by t in FIG. 1) of the gap.

Numeral 95 designates a gas passage extending through the cooling passage 23. The dielectric sheet 4 has a hole at a position corresponding to the gas passage 95 to allow the gas to pass therethrough.

Here will be described the operations.

With the gap adjusting sheets, the protrusion height of the spacers 601 are adjusted highly precisely to 0.1 mm±0.01 mm, for example thereby to adjust the gap of the discharge cell. An oxygen gas is supplied from a gas supply port 7 in the outer circumferential portion of the electrode, and a high AC voltage is applied through the dielectric sheet 4 between the earthed electrode 2 and the high-voltage electrode 3. Then, a dielectric barrier discharge is established in the discharging gap 5 so that the oxygen gas is converted by that discharge into an ozone gas and extracted from a gas exit 9.

The production efficiency of ozone can be improved not only by shortening the gap length but also by homogenizing the discharge or by lowering the temperature of the gas existing in the discharging portion so that ozone can be produced highly efficiently by the construction of this invention (with a result of ozone in high density).

The depth of the hole portion 600 can be easily finished in a higher precision than 0.05 mm by a machining work. If there are prepared gap adjusting sheets 603 of various thicknesses, it is not difficult to adjust the total thickness of the spacer 601 and the gap adjusting sheets 603 accurately to a desired value with respect to the depth of the hole portion 600. The depth of the hole portion 600 or the thickness of the spacer 601 is so determined that the height of the head of the screw 602 may be lower than the face of the high-voltage electrode 3 when the screw 602 is fastened. Alternatively, the screw 602 is made of an insulator such as ceramics. Then, it is possible to reduce the discharge from the head of the screw 602.

A pressure releasing hole may be formed in the spacer 601 so that the gas, as might otherwise be confined in the spacer 601, may not be raised to a high temperature/pressure by the discharge thereby to cause another problem.

With the construction of FIG. 1, it was possible to set the gap length at 0.1 mm with a precision of ±0.01 mm or less. The ozone density could be as high as 300 g/Nm, and the power consumption for producing the ozone could be 8 kwh/kg-$O_3$.

Embodiment 2

An ozonizer of Embodiment 2 of this invention will be described with reference to FIGS. 3, 4 and 5.

Figure 3:
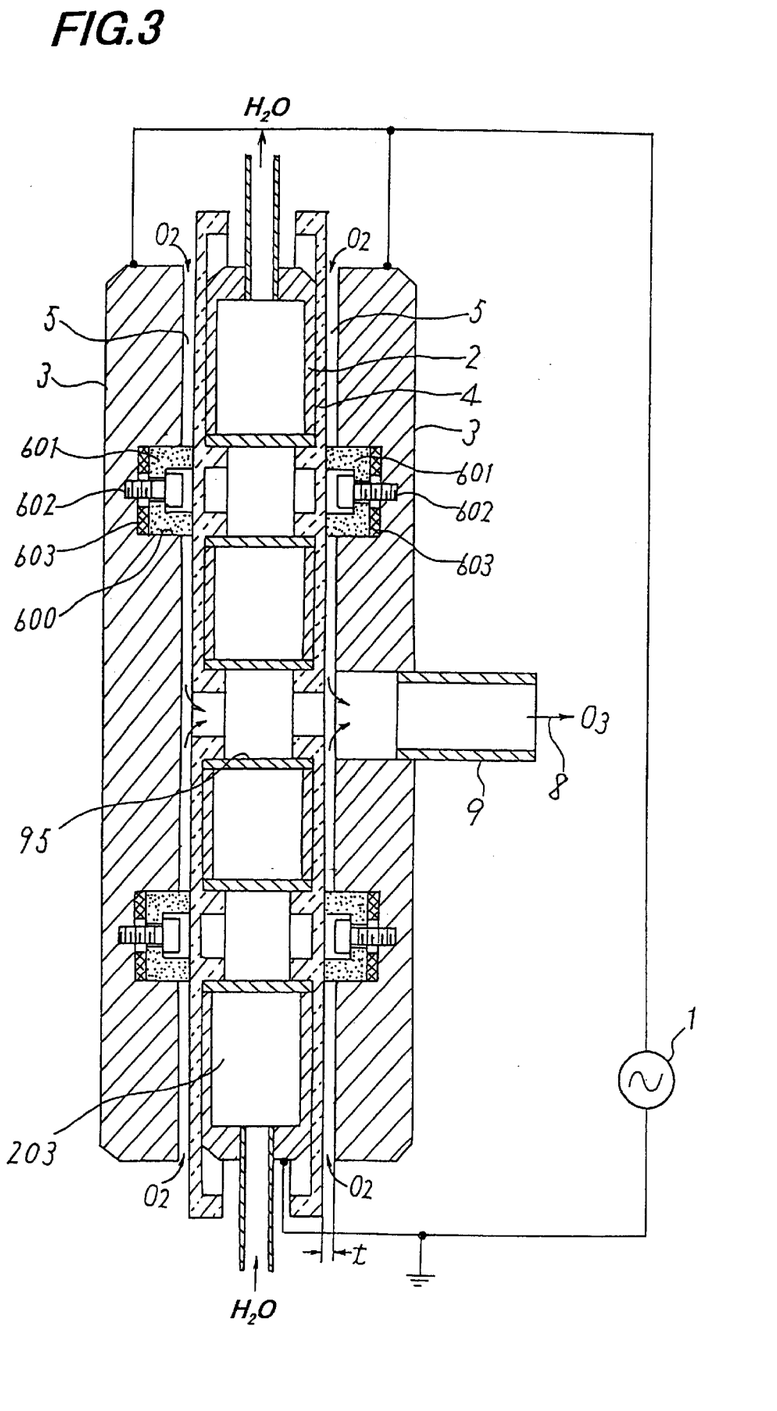
FIG. 3 is a sectional view of an ozonizer of Embodiment 2.

FIG. 3 is a sectional view of a discharge cell portion of the ozonizer; FIG. 4 is a perspective view (partially in section) of the earthed electrode 2; and FIG. 5 is a view (partially in section) of the dielectric sheet 4.

The earthed electrode 2 is provided with a plurality of through holes 101 extending through its cooling passage 23. Pipe- or rod-shaped reinforcing members 102 are inserted into and soldered or adhered to those through holes 101. By these reinforcing members 102, the front and back sides of the electrode are mechanically bound even in the presence of the cooling passage 23, so that the electrode faces are lightened in their deformations, as might otherwise be caused by the water pressure, and improved in their smoothness. Here, the gas passage 95 and the through holes 101 may be equally or differently sized.

Figure 4:
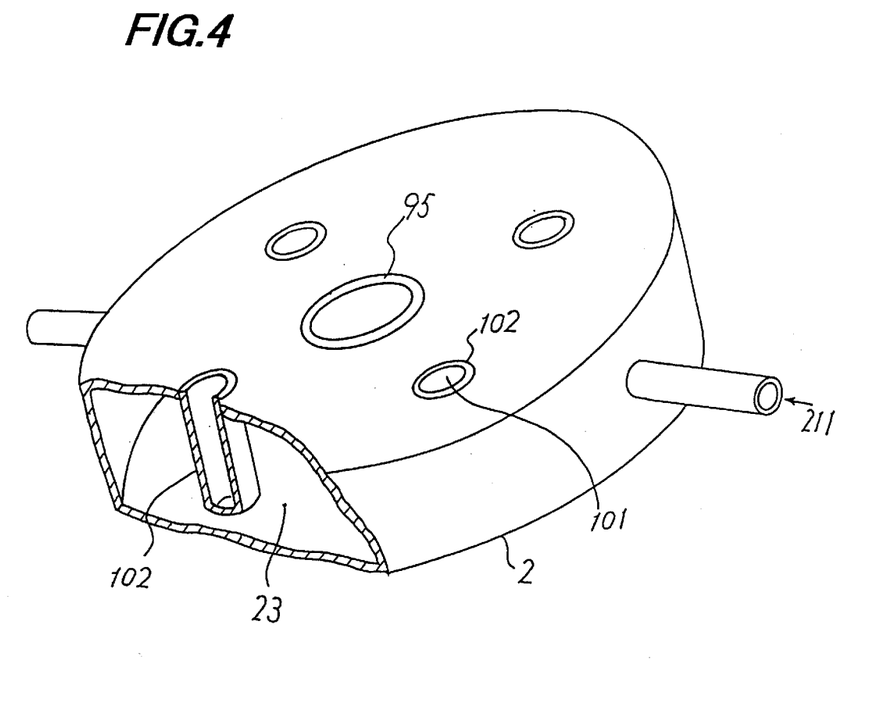
FIG. 4 is a detailed view of an earthed electrode of FIG. 3.

The earthed electrode 2 of FIG. 4 is enabled to reduce its jointing steps drastically thereby to produce a highly accurate earthed electrode by casting or die-casting it of aluminum, stainless steel or titanium.

Figure 5:
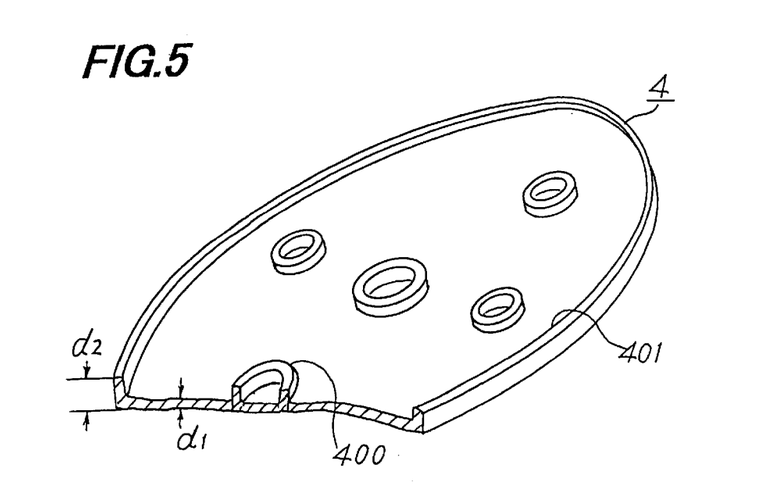
FIG. 5 is a detailed view of a dielectric sheet of FIG. 3.

In FIG. 5, numeral 400 designates projections formed on the dielectric sheet 4. These projections 400 are given a larger thickness (as indicated by d2) than the thickness (as indicated by d1) of the dielectric sheet 4. On the other hand, the diameter of the projections are sized to allow them to be snugly fitted in the holes 101 of the earthed electrode 2. With the shape of FIG. 5, the dielectric sheet 4 can be high in flatness and parallelism just after sintered even with no shaping work. What is required as an after-work may be a one-side polish to provide an inexpensive dielectric sheet. The front side of the dielectric sheet 4, as formed by fitting those projections 400 in the through holes 101 of FIG. 4, can have the improved flatness and parallelism and the raised mechanical strength as the dielectric sheet is firmly jointed to the high-voltage electrode 3 to enhance the sizing accuracy of the discharging gap 5.

If the outer circumferential portion of the dielectric sheet 4 is provided with a thickened reinforcing edge 401, the flatness and the parallelism can be better improved to protect the outer circumferential portion of the dielectric sheet 4 when handled, and can contribute to an improvement in the spatial insulation between the electrodes, as shown in FIG. 3.

Here, the projections 400 are shown as the cylindrical shape in FIG. 5 but may be exemplified by solid columns or may have a square section.

Embodiment 3

An ozonizer of Embodiment 3 of this invention will be described with reference to FIG. 6.

Figure 6:
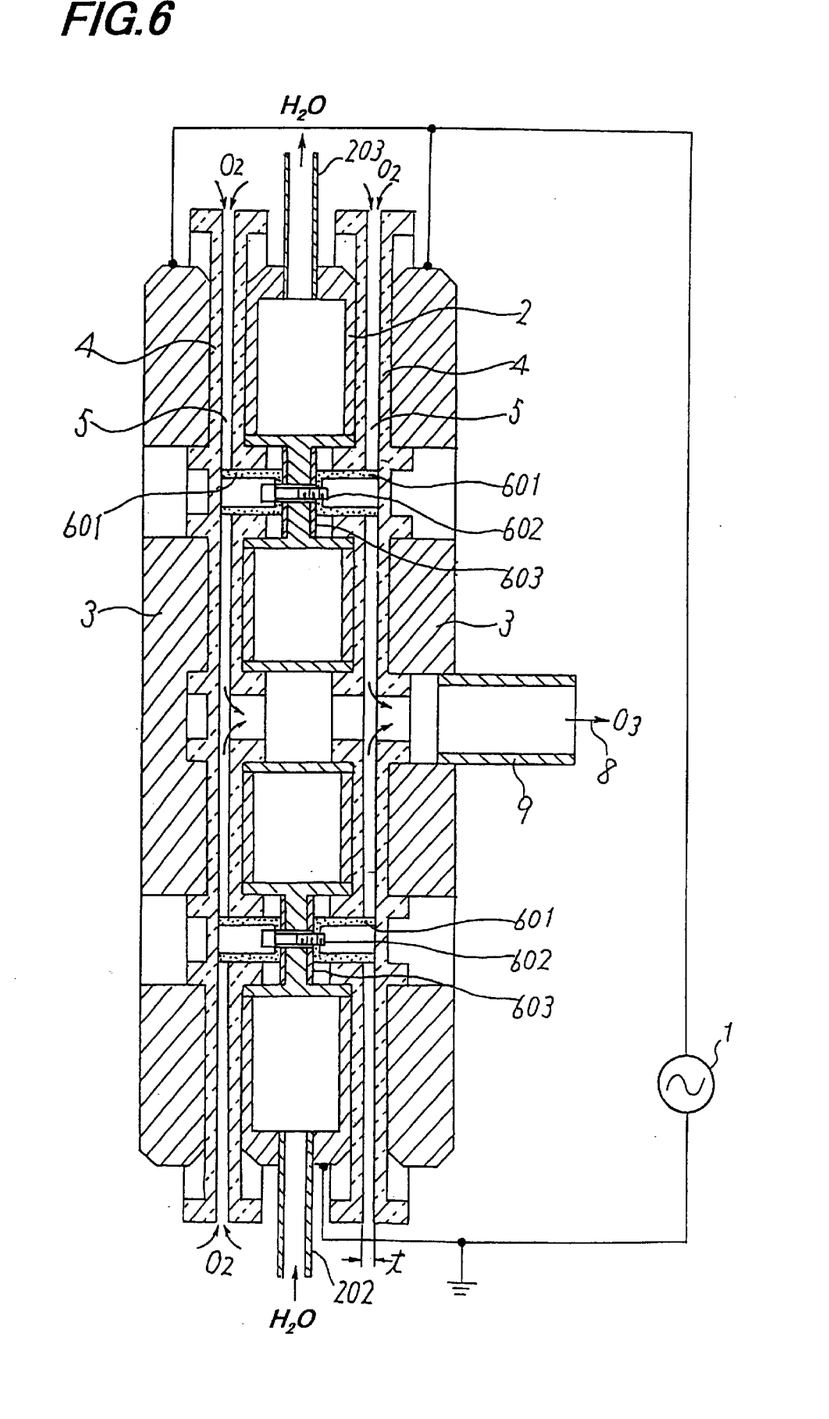
FIG. 6 is a sectional view of an ozonizer of Embodiment 3.

The discharge cell of FIG. 6 is devised to reduce emission of the metal particles which are produced from the electrode surface at the time of producing the ozone by the dielectric barrier discharge, so that the ozonized gas can be produced in high purity. In FIG. 6, the spacer 601 is attached to the side of the earthed electrode 2 but may be attached to the side of the high-voltage electrode 3.

The holes 101 of FIG. 4, as formed in the earthed electrode 2 of FIG. 4 of Embodiment 2, are utilized as the hole portions 600. The dielectric sheet 4 is attached to the two sides of the discharging gap 5, and one of the side has a hole for fitting the spacer 601. This spacer 601 is also made of an inorganic substance such as ceramics so that this discharging gap 5 is completely covered with the ignorganic substance. Thus, the discharging gap 5 is wholly covered with the inorganic substance so that the metal particles are not scraped and dispersed by the discharge. Here in FIG. 6, the holes 101 formed in the earthed electrode 2, as shown in FIG. 4 of Embodiment 2, are utilized as the hole portions for fitting the spacer 601 therein. However, the holes 101 do not extend through but are provided with reinforcing members so as to allow the fastening with the screws.

Embodiment 4

Figure 7A:
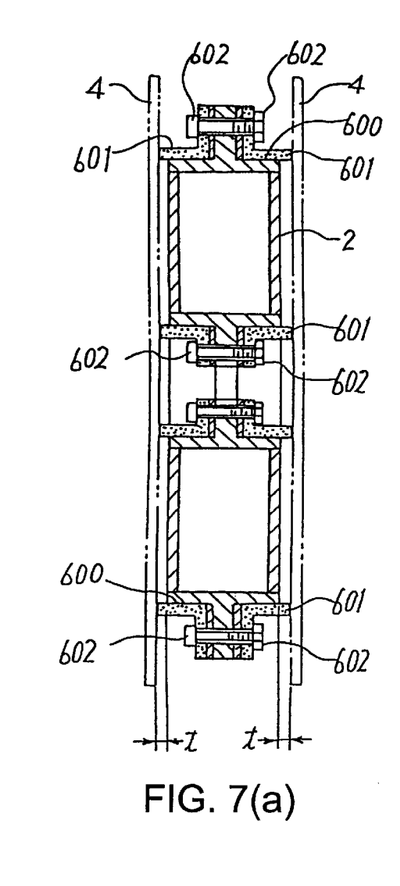
Figure 7B:
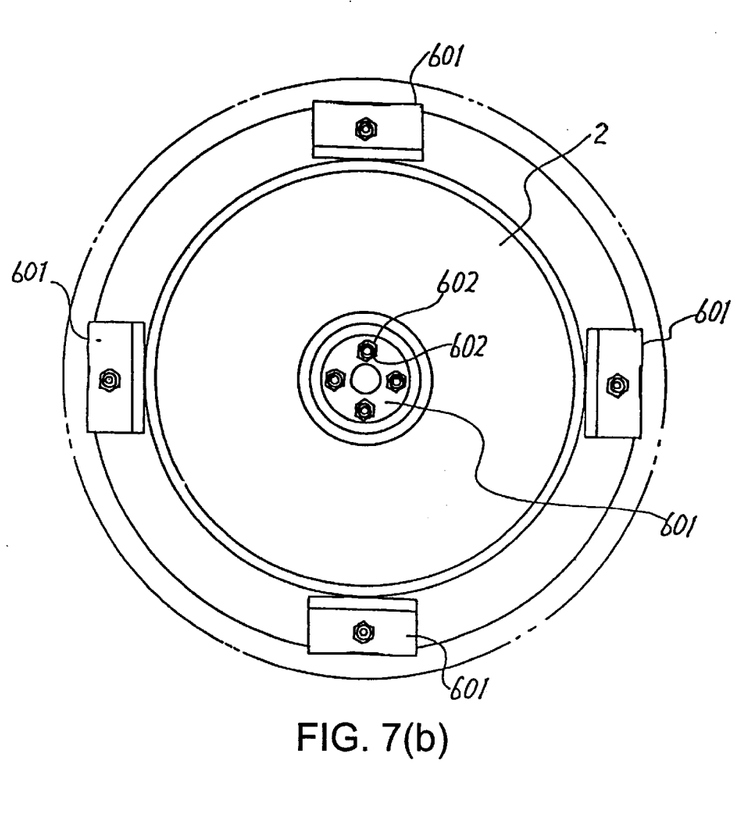

An ozonizer of Embodiment 4 of this invention will be described with reference to FIGS. 7(a) and 7(b) showing an example in which the spacer 601 is attached to the two sides of the earthed electrode 2. FIG. 7(a) presents a sectional view, and FIG. 7(b) presents a front elevation. In Embodiments 1 to 3, the spacer 601 is attached to the discharge face of the inner side of the discharging gap 5 so that some percentages of the discharge area cannot contribute to the discharge to lower the efficiency. In FIGS. 7(a) and 7(b) therefore, the hole portion 600 is formed in the non-discharge face of the side wall of the outer circumferential edge of the electrode so that the spacer 601 may be attached to the outer side of the discharge face, i.e., to the outer side of the outer circumferential edge of the electrode. As a result, the discharge area is neither reduced, nor is disturbed the gas flow in the discharging gap 5 by the spacer 601, so that the gas flow can be homogenized to ensure the ozonization stably thereby to improve the efficiency.

Embodiment 5

Figure 8:
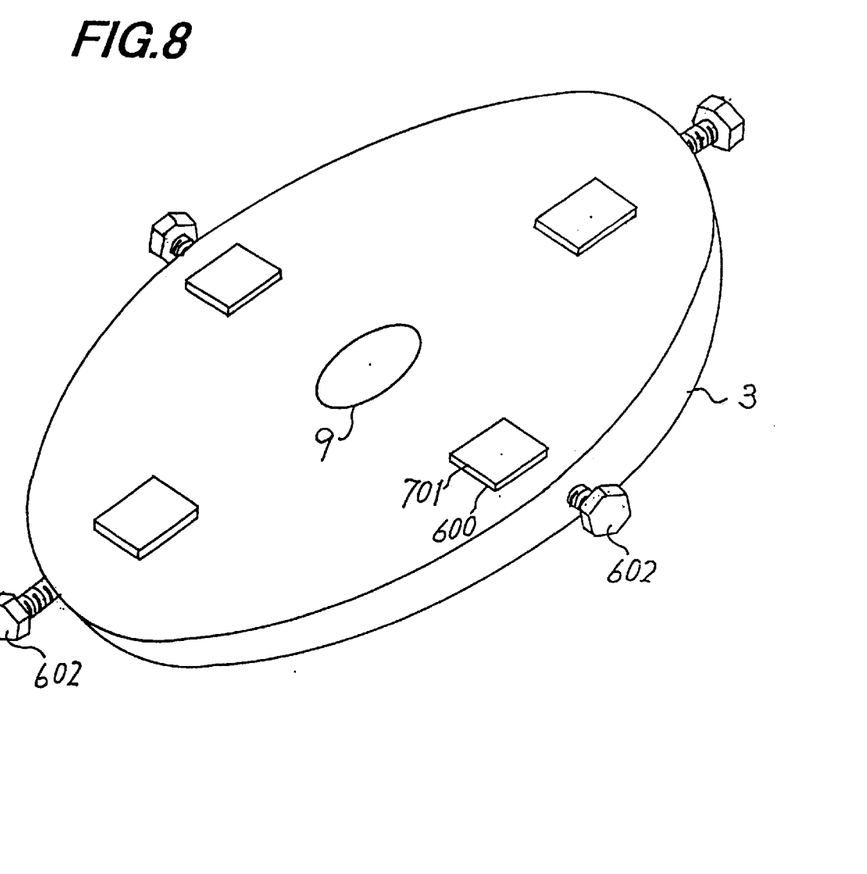
FIG. 8 is a detailed view of a portion of an ozonizer of Embodiment 5.
Figure 9:
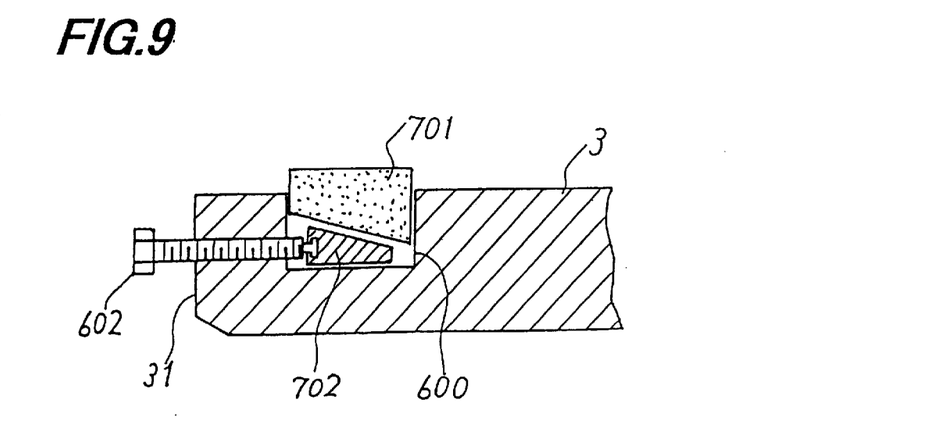
FIG. 9 is a sectional view of a portion of FIG. 8.

FIGS. 8 and 9 show a portion of an ozonizer according to Embodiment 5 of this invention. As shown, the hole portion 600 is formed into a square shape. Numeral 701 designates a tapered spacer which is fitted in the hole portion 600 and formed into a wedge shape, and numeral 702 designates a wedge underlying the tapered spacer 701. To the wedge 701, there is so jointed the screw 602 from the side face 31 of the high-voltage electrode 3 that its leading end rotates freely but does not come out. As the screw 602 is turned in an internal thread formed in the high-voltage electrode 3, the wedge 702 is moved to the right or left of FIG. 9. As a result, the tapered spacer 701 is pushed upward, as the wedge 702 is moved to the right, and is moved downward (by the earthed electrode 2) as the same is moved to the left. In other words, the size of the discharging gap can be adjusted without disassembling the combination of the electrodes.

The discharging gap 5 can be adjusted while the discharge being observed by applying the voltage, if an insulated tool is used, if the screw 602 is made of the insulator such as ceramics, or the hole portion is formed on the side of the earthed electrode 2.

In the Figures of the individual embodiments thus far described, the shapes of the hole portion 600 and the spacer 601 should not be limited to the shown ones but may naturally take any shape such as circle, ellipse or square if they can have the function to hold the space. On the other hand, the material for the spacer 601 may preferably be an inorganic insulator but may be exemplified by a metal such as stainless steel but for the case, in which the metal should not be exposed to the inside of the discharging gap.

While the presently preferred embodiments of the invention have been shown and described, it is to be understood that these disclosures are for the purpose of illustration and that various changes and modifications may be made without departing from the scope of the invention as set forth in the appended claims.

What is claimed is:

1. An ozonizer comprising:

first and second generally planar electrodes facing each other and separated by a gap, the first electrode having an opening in a discharge surface facing a discharge surface of the second electrode;

a dielectric sheet disposed on the discharge surface of at least one of the first and second electrodes;

a high-voltage applying unit for applying a high voltage between the first and second electrodes;

a gas supply unit for supplying a gas containing oxygen to the gap between the first and second electrodes;

a spacer disposed in the opening, protruding from the discharge surface of the first electrode toward the second electrode and forming the gap; and an adjusting member for adjusting protrusion of the spacer from the discharge surface of the first electrode for precisely defining width of the gap.

2. The ozonizer according to claim 1, wherein the spacer is removable from the opening.

3. The ozonizer according to claim 1, wherein the first and second planar electrodes have non-discharge surfaces not facing each other, and the opening is in said non-discharge surface.

4. The ozonizer according to claim 1, wherein the adjusting member is a gap adjusting sheet between the spacer and the second electrode.

5. The ozonizer according to claim 1, wherein the adjusting member includes an adjusting screw.

6. The ozonizer according to claim 5, wherein the protrusion of the spacer is adjustable from a side of the first electrode.

7. The ozonizer according to claim 6, wherein the spacer includes a tapered member.

8. The ozonizer according to claim 7, wherein the tapered member includes a first surface oblique to the discharge surface and the side surface and the adjusting member includes a second oblique surface bearing on the first oblique surface for adjusting protrusion of the spacer upon turning the adjusting screw.

9. The ozonizer according to claim 1, wherein the electrode on which the dielectric sheet is disposed has an opening in the discharge surface, and the dielectric sheet has a projection disposed in the opening in the electrode.

10. The ozonizer according to claim 9, wherein the dielectric sheet and the projection are a single sintered body.

11. The ozonizer according to claim 1, including first and second dielectric sheets respectively disposed on the discharge surfaces of the first and second electrodes, the second dielectric sheet having a through hole corresponding to the opening in the second electrode.

12. The ozonizer according to claim 1, wherein at least one of the first and second electrodes includes a cooling passage for passage of a coolant, and a reinforcing member extending from a front face to a back face of the electrode through the cooling passage.

13. The ozonizer according to claim 12, wherein the reinforcing member is a cylindrical member having the spacer therein.

14. The ozonizer according to claim 12, wherein at least one of the first and second electrodes is a material selected from the group consisting of cast aluminum, stainless steel, and titanium.

15. An ozonizer comprising:

first and second generally planar electrodes facing each other and separated by a gap, the first electrode having an opening in a discharge surface facing a discharge surface of the second electrode;

a high-voltage applying unit for applying a high voltage between the first and second electrodes;

a gas supply unit for supplying a gas containing oxygen to the gap between the first and second electrodes;

a spacer disposed in the opening in the first electrode and protruding from the first electrode and forming the gap; and a cooling passage in at least one of the first and second electrodes for passage of a coolant, and a reinforcing member extending through the cooling passage from a front face to a back face of each of the first and second electrodes that includes a coolant passage.

16. The ozonizer according to claim 15, wherein at least one of the first and second electrodes is a material selected from the group consisting of cast aluminum, stainless steel, and titanium.

* * * * *